United States Patent [19]
Wilander

[11] 3,788,675
[45] Jan. 29, 1974

[54] GROUND LEVEL LOADING TRAILER

[76] Inventor: Roger R. D. Wilander, 926 North Central Avenue, Duluth, Minn. 55807

[22] Filed: May 1, 1972

[21] Appl. No.: 249,613

[52] U.S. Cl............... 280/43.11, 214/390, 214/506
[51] Int. Cl.............................................. B60p 1/00
[58] Field of Search. 214/505, 506, 373; 280/43.11, 280/43, 43.1, 43.12

[56] References Cited
UNITED STATES PATENTS
| | | | |
|---|---|---|---|
| 2,953,266 | 9/1960 | Anderson | 214/506 |
| 2,905,481 | 9/1959 | Schramm | 214/505 X |
| 2,650,730 | 9/1953 | Rohm | 214/506 |
| 2,442,071 | 5/1948 | Bunten | 280/43.11 |
| 2,577,246 | 12/1951 | Hill | 280/43.11 X |
| 2,870,928 | 1/1959 | Haggard et al. | 214/373 |

*Primary Examiner*—Albert J. Makay
*Attorney, Agent, or Firm*—Wicks & Nemer

[57] ABSTRACT

A ground level loading trailer having a load support in the form of a platform adapted to lie flat on the ground for loading together with a U-shaped lifting device straddling the platform and pivoted on supporting wheels and also pivoted to the load support, said lifting device when the load support is in loading position extending angularly upwardly therefrom and when brought down into juxtaposition with the load support, raising the load support into elevated position.

6 Claims, 5 Drawing Figures

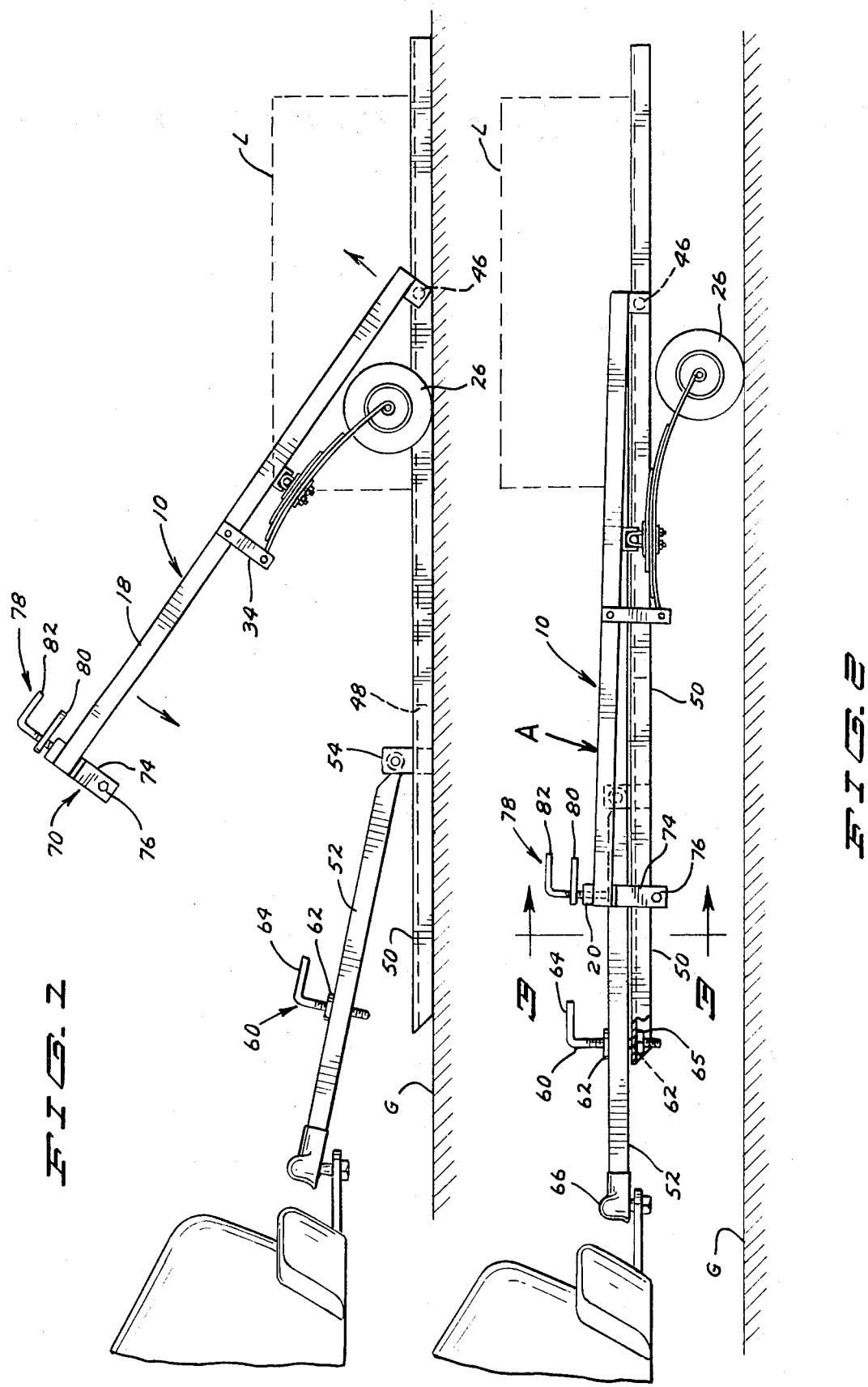

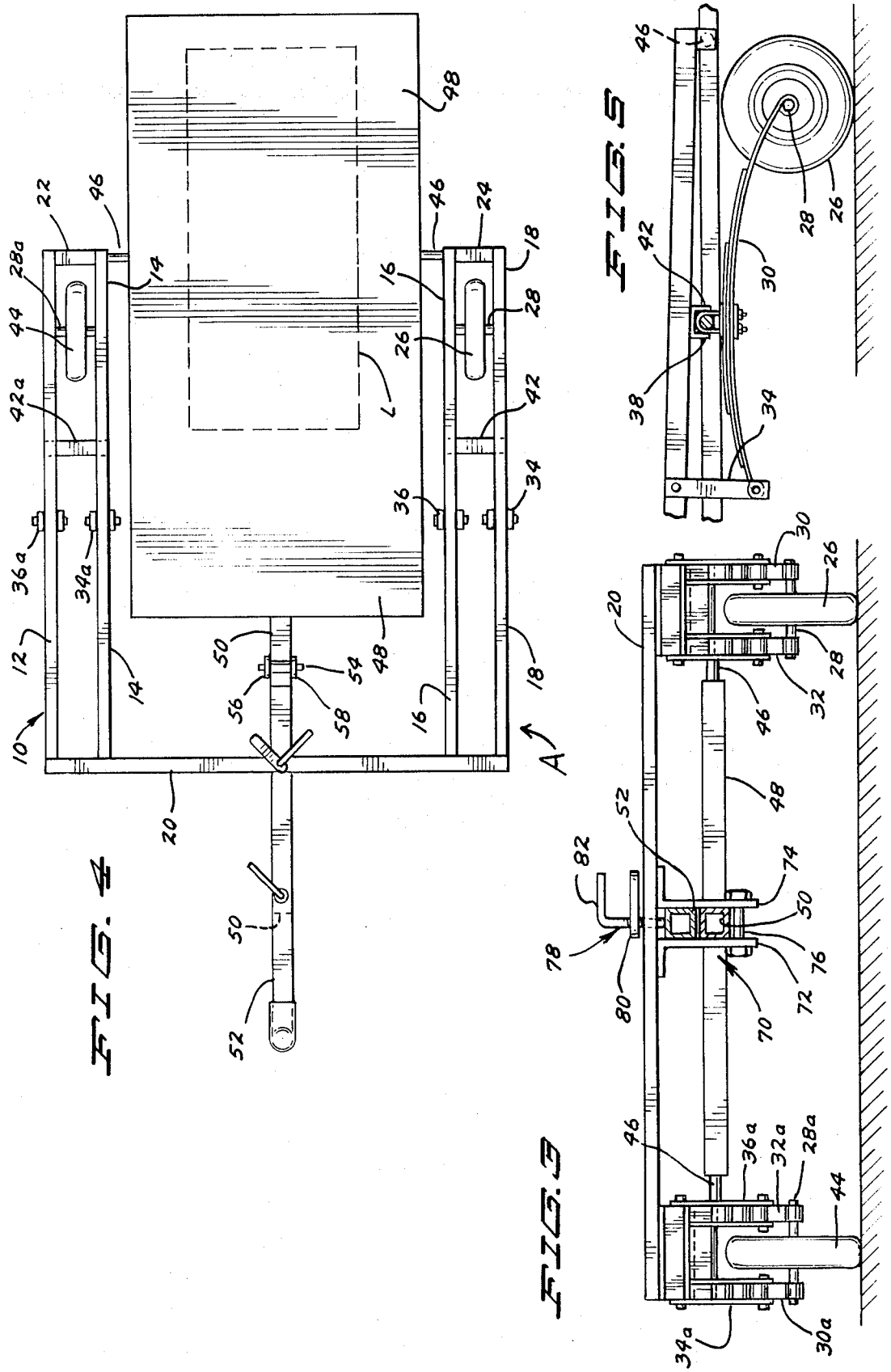

GROUND LEVEL LOADING TRAILER

SUMMARY OF THE INVENTION

The invention relates generally to trailers and more particularly to trailers drawn behind an automobile. With many conventional well known trailers the user is plagued with the problem of getting the load upon the trailer from ground level. With the present trailer disclosed herein the load support or platform is placed on the ground and simply and easily raised to operative trailing position by actuation of the frame portions relative to the platform. The platform is lowered to the ground for unloading by reversing the procedure.

In the drawings forming part of this application:

FIG. 1 is a side elevation of a trailer with raisable bed in lowered loading position embodying the invention.

FIG. 2 is a side elevation of the trailer in a loaded operable position.

FIG. 3 is a sectional view on the line 3—3 of FIG. 2.

FIG. 4 is a top plan view of the trailer in loaded operable position.

FIG. 5 is an enlarged view of the frame and wheel.

Referring to the drawings in detail, the trailer A includes a lifting device in the form of the U-shaped frame 10 formed of the right side spaced stringers 12 and 14 and the left side spaced stringers 16 and 18. The stringers are connected at the forward ends to the front transverse bar 20. The stringers 12 and 14 are connected at the rear ends by the short rear transverse bar 22, and the stringers 16 and 18 are connected at the rear ends by the short rear transverse bar 24.

A left supporting member in one form of the wheel 26 is provided which is mounted on the axle 28. The axle 28 is mounted on the rear ends of a pair of leaf springs 30 and 32 which overlie the stringers 18 and 16. The front ends of the springs 30 and 32 are mounted in the shackles 34 and 36 secured to the stringers 18 and 16, respectively. The springs 30 and 32 are further mounted intermediate the ends thereof upon the rod 38 in the shackles 40 secured to bar 42 which in turn is secured to the stringers 16 and 18. With such construction the wheel 26 is positioned for movement up and down intermediate the stringers 16 and 18.

The right supporting member in the form of wheel 44 is mounted by means of identical construction which bears the same reference numerals but accompanied by a lower case letter *a*.

The numeral 46 designates a transverse shaft which is secured to the underside of the rear ends of the stringers 12, 14, 16, and 18. The shaft 46 provides pivot means and is pivotally secured to the undersurface of the load support in one form in the platform 48. The shaft 46 is positioned rearwardly of the wheel axles 28*a* and 28. Extending forwardly from the front end of the platform 48 is the extension member 50. A draft member in one form of the tongue member 52 is pivotally connected at its rear end to the platform extension member 50 by means of the bolt 54 mounted on the lugs 56 and 58 secured to the sides of the extension 50. The tongue member 52 has mounted thereon the clamping screw connector 60 threaded at its lower portion and secured thereto is the stop 62. The connector 60 has a handle formation 64 on the upper end. The threaded end of the connector 60 is nut equipped with nut 65. The extreme forward end of the tongue member 52 is equipped with the conventional hitch 66. The forward end of the extension 50 has a hole 68 formed therein through which the connector 60 extends as hereinafter set forth.

The numeral 70 designates a yoke formed of the spaced legs 72 and 74 secured to the underside of the frame transverse bar 20 centrally thereof. Extending between and secured to the legs 72 and 74 is the removable pin 76. Further provided is the securing device in the form of the connector 78 which threadedly engages the bar 20 and extends therethrough and between the legs 72 and 74. A lock nut 80 is provided on the connector 78 together with the handle 82.

OPERATION

In the operation of the device A the same is placed in the position of FIG. 1 with the platform on the ground G. In this position a load illustrated as L is easily run onto the platform from the ground. With the load L on the platform downward pressure is placed upon the forward end of the U-shaped frame 10 which lifts the rear end of the platform upwardly with the same resting on the ground on the forward end of the extension 50. As this is done the extension and the tongue 52 are brought together sufficiently so that the yoke 70 may receive both extension 50 and tongue 52 whereby the pin 76 may be inserted to connect extension 50 and tongue 52 together preliminarily. The connector 78 is then screwed down to draw the extension 50 and tongue 52 tightly together as in FIGS. 2 and 3. The connector 60 is engaged in the hole in the end of the extension 50 and drawn up on the nut to hold the tongue and extension 50 tightly together and as this is accomplished the trailer is in the condition of FIG. 2 for trailering. To drop the platform 48 onto the ground for unloading the above procedure is reversed whereby the load may be easily run off the platform.

I claim:

1. A ground level loading trailer comprising:
   a. a load support having an extension extending forwardly and centrally thereof and adapted to rest upon the ground,
   b. a tongue pivoted to said load support centrally thereof at the forward portion thereof and adapted to be connected to a motor vehicle,
   c. an elongated lifting device,
   d. supporting wheels pivoted to said lifting device and situated intermediate the ends thereof,
   e. said lifting device pivotally connected to said load support at the rear end of the lifting device and intermediate the ends of the load support, and
   f. securing means for securing the lifting device, the extension of the load support and the tongue together in juxtaposition Whereby the load support is lifted to and held in a position raised from and parallel to the ground.

2. The device of claim 1 in which
   a. the lifting device is U-shaped in form and straddles the load support.

3. The device of claim 1 in which:
   a. the extension of the load support underlies said tongue,
   b. said tongue and extension being pivoted together at their rearward ends and
   c. clamping means for clamping the forward ends of said tongue and extension together.

4. The device of claim 3 in which said U-shaped lifting device includes a. spaced side stringers connected at the forward ends by
b. a front transverse bar.

5. The device of claim 1 in which said lifting device includes
a. spaced side stringers connected at the forward ends by
b. a front transverse bar.

6. The device of claim 1 in which said securing means includes
a. a yoke connected to said lifting device for engagement about said extension and said tongue and
b. means for securing said extension and tongue within said yoke.

* * * * *